(12) United States Patent
Burns

(10) Patent No.: US 9,031,381 B2
(45) Date of Patent: May 12, 2015

(54) SYSTEMS AND METHODS FOR GENERATION OF COMPOSITE VIDEO FROM MULTIPLE ASYNCHRONOUSLY RECORDED INPUT STREAMS

(71) Applicant: Panopto, Inc., Seattle, WA (US)

(72) Inventor: Eric Burns, Seattle, WA (US)

(73) Assignee: Panopto, Inc., Pittsburgh, PA (US)

( * ) Notice: Subject to any disclaimer, the term of this patent is extended or adjusted under 35 U.S.C. 154(b) by 33 days.

(21) Appl. No.: 13/868,301

(22) Filed: Apr. 23, 2013

(65) Prior Publication Data

US 2013/0294749 A1 Nov. 7, 2013

Related U.S. Application Data

(60) Provisional application No. 61/641,946, filed on May 3, 2012.

(51) Int. Cl.
| | | |
|---|---|---|
| H04N 5/94 | (2006.01) | |
| H04N 9/87 | (2006.01) | |
| G09G 5/14 | (2006.01) | |
| H04N 5/445 | (2011.01) | |
| H04N 5/783 | (2006.01) | |
| H04N 21/845 | (2011.01) | |
| H04N 21/2365 | (2011.01) | |
| H04N 21/2665 | (2011.01) | |
| H04N 21/2743 | (2011.01) | |
| H04N 21/414 | (2011.01) | |
| H04N 21/4223 | (2011.01) | |
| H04N 21/434 | (2011.01) | |
| H04N 21/6543 | (2011.01) | |
| H04N 21/81 | (2011.01) | |
| H04N 21/2187 | (2011.01) | |
| H04N 21/4788 | (2011.01) | |

(52) U.S. Cl.
CPC .. *H04N 9/87* (2013.01); *G09G 5/14* (2013.01); *H04N 5/445* (2013.01); *H04N 5/783* (2013.01); *H04N 21/8456* (2013.01); *H04N 21/2187* (2013.01); *H04N 21/2365* (2013.01); *H04N 21/2665* (2013.01); *H04N 21/2743* (2013.01); *H04N 21/41407* (2013.01); *H04N 21/4223* (2013.01); *H04N 21/4347* (2013.01); *H04N 21/4788* (2013.01); *H04N 21/6543* (2013.01); *H04N 21/8153* (2013.01); *G09G 2370/20* (2013.01)

(58) Field of Classification Search
CPC ....... H04N 9/87; H04N 9/8042; H04N 5/783; H04N 5/445; H04N 21/8446; G11B 27/405; G11B 27/034; G11B 27/34; G11B 2220/90
See application file for complete search history.

(56) References Cited

U.S. PATENT DOCUMENTS

| | | | | |
|---|---|---|---|---|
| 2011/0025918 | A1* | 2/2011 | Staker et al. | 348/584 |
| 2011/0150421 | A1* | 6/2011 | Sasaki et al. | 386/241 |
| 2013/0250121 | A1* | 9/2013 | Piran et al. | 348/159 |

*Primary Examiner* — William C Vaughn, Jr.
*Assistant Examiner* — Eileen Adams
(74) *Attorney, Agent, or Firm* — Jones Day

(57) ABSTRACT

Systems and methods are provided for generating a composite video based on a plurality of asynchronously recorded input video streams. A plurality of segments of the input video streams are identified. A number of the input video streams that were recording during the particular segment are determined. A video display configuration for the particular segment is determined based on the number of video streams that were recording, where the video display configuration includes a display sub-region for each of the number of video streams that was recording. A composite video is generated, where the composite video includes a portion of video associated with each of the segments, where the composite video portion associated with the particular segment is formatted according to the video display configuration and displays the video streams that were recording during the particular segment in the display sub-regions of the video display configuration.

30 Claims, 13 Drawing Sheets

(a)

(b)

(c)

(d)

(a)

(b)

(c)

(d)

(a)　　　(b)　　　(c)　　　(d)

(e)　　　(f)　　　(g)　　　(h)

SYSTEMS AND METHODS FOR GENERATION OF COMPOSITE VIDEO FROM MULTIPLE ASYNCHRONOUSLY RECORDED INPUT STREAMS

CROSS-REFERENCE TO RELATED APPLICATIONS

This disclosure claims priority to U.S. Provisional Patent Application No. 61/641,946, filed on May 3, 2012, which is incorporated herein by reference in its entirety.

This disclosure is related to U.S. patent application Ser. No. 11/489,840, filed Jul. 20, 2006, and U.S. patent application Ser. No. 11/634,441, filed Dec. 6, 2006, the entirety of both of which is herein incorporated by reference.

TECHNICAL FIELD

The technology described herein relates generally to video production and more particularly to composite video production from multiple input video sources.

BACKGROUND

When recording video of an event (e.g., a movie scene, a sporting event, a concert), it is often desirable to capture the event from multiple points of view, using multiple video capture devices. Creating a final video product from video captured using the multiple video capture devices can be a time consuming and expensive process. Oftentimes, costly video editing hardware and software is used to splice together portions of video from the different capture devices to provide a final product. Generation of that final product using the video editing hardware and software may require many hours of effort by one or more video editing personnel.

SUMMARY

Systems and methods are provided for generating a composite video based on a plurality of asynchronously recorded input video streams. In a method of generating a composite video based on a plurality of asynchronously recorded input video streams, a plurality of segments of the input video streams are identified, where a particular segment begins when one of the input video streams starts or stops recording, and where the particular segment ends when one of the input video streams starts or stops recording. A number of the input video streams that were recording during the particular segment are determined. A video display configuration for the particular segment is determined based on the number of video streams that were recording, where the video display configuration includes a display sub-region for each of the number of video streams that was recording. A composite video is generated, where the composite video includes a portion of video associated with each of the segments, where the composite video portion associated with the particular segment is formatted according to the video display configuration and displays the video streams that were recording during the particular segment in the display sub-regions of the video display configuration.

In another example, a computer-implemented system for generating a composite video based on a plurality of asynchronously recorded input video streams includes one or more computer memories for storing a timeline data structure. The timeline data structure includes identifications of stop and start times for the plurality of asynchronously recorded input video streams with respect to a global timeline. The computer-implemented system further includes a data processor configured to identify a plurality of segments of the input video streams, where a particular segment begins when one of the input video streams starts or stops recording, and where the particular segment ends when one of the input video streams starts or stops recording. A number of the input video streams that were recording during the particular segment are determined. A video display configuration for the particular segment is determined based on the number of video streams that were recording, where the video display configuration includes a display sub-region for each of the number of video streams that was recording. The one or more computer memories is further configured to store a composite video data structure, where the composite video data structure is configured to store data sufficient to identify video display configurations for each of the plurality of segments including the particular segment.

In another example, a computer-implemented system for generating a composite video based on a plurality of asynchronously recorded input video streams includes one or more data processors and one or more computer-readable mediums encoded with instructions for commanding the one or more data processors to execute steps. The steps include identifying a plurality of segments of the input video streams, where a particular segment begins when one of the input video streams starts or stops recording. The particular segment ends when one of the input video streams starts or stops recording. The steps further include determining a number of the input video streams that were recording during the particular segment and determining a video display configuration for the particular segment based on the number of video streams that were recording. The video display configuration includes a display sub-region for each of the number of video streams that was recording. The steps also include generating a composite video, where the composite video includes a portion of video associated with each of the segments. The composite video portion associated with the particular segment is formatted according to the video display configuration and displays the video streams that were recording during the particular segment in the display sub-regions of the video display configuration.

In another example, a non-transitory computer-readable medium is encoded with instructions for commanding one or more data processors to execute steps for generating a composite video based on a plurality of asynchronously recorded input video streams. The steps include identifying a plurality of segments of the input video streams, where a particular segment begins when one of the input video streams starts or stops recording. The particular segment ends when one of the input video streams starts or stops recording. The steps further include determining a number of the input video streams that were recording during the particular segment and determining a video display configuration for the particular segment based on the number of video streams that were recording. The video display configuration includes a display sub-region for each of the number of video streams that was recording. The steps also include generating a composite video, where the composite video includes a portion of video associated with each of the segments. The composite video portion associated with the particular segment is formatted according to the video display configuration and displays the video streams that were recording during the particular segment in the display sub-regions of the video display configuration.

DETAILED DESCRIPTION

While time consuming video editing operations that rely on expensive video editing hardware and software may be desirable in some applications (e.g., in creating a feature film or documentary), such sophistication may not be necessary in all video editing scenarios. In some implementations, it may be desirable to create a composite video output based on multiple input video streams in an automated fashion that requires little or no user input beyond providing the multiple input video streams.

For example, a group of friends may wish to combine their experiences at an event, such as a concert, into a composite video that captures their point of view during the event (e.g., a "video party"). Each of the friends may capture all or portions of the event using mobile phone video capturing capabilities. The multiple input video stream recordings may not be recorded in synch with one another. Each of the friends may start their individual recordings at different times, and each of the individual recordings may span different periods of the event (e.g., one of the friends turns his camera video off while taking a snack break). After the event, the group of friends may wish to compile their point of view videos from the event and create a composite video, where they can view the event through the perspective of not only themselves, but also through the perspective of other friends who were recording the event.

Such a system may be utilized in a number of other scenarios as well. For example, a composite video may be generated based on multiple input video streams recorded at a sporting event. Certain of the input video streams may be recorded throughout the duration of the event using dedicated video cameras. At certain times during the event, additional input video streams may be provided by other video capture devices, such as a report by a roving reporter. Many other usage scenarios are also contemplated by the scope of this disclosure.

Figure 1:
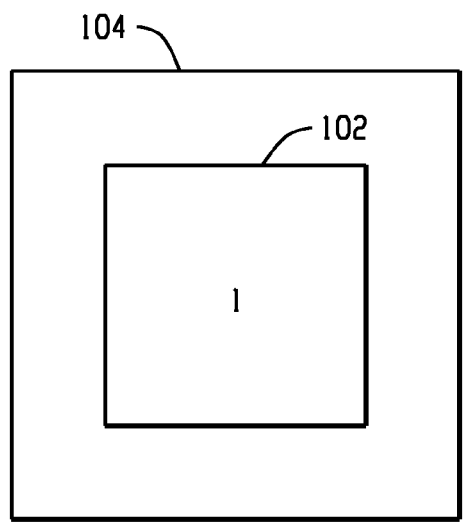
FIG. 1 depicts different composite video configurations that may be generated by a multi-stream compositing engine based on input video streams provided from four video capture devices.
Figure 1:
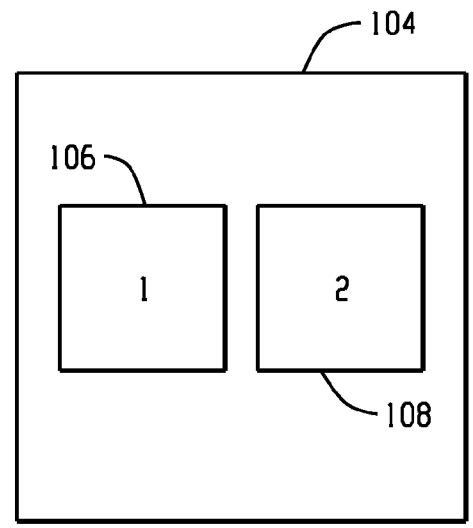
Figure 1:
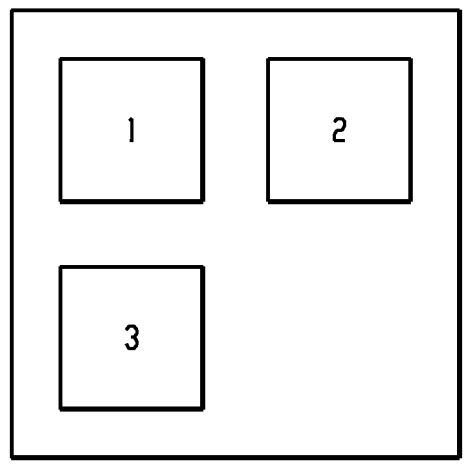
Figure 1:
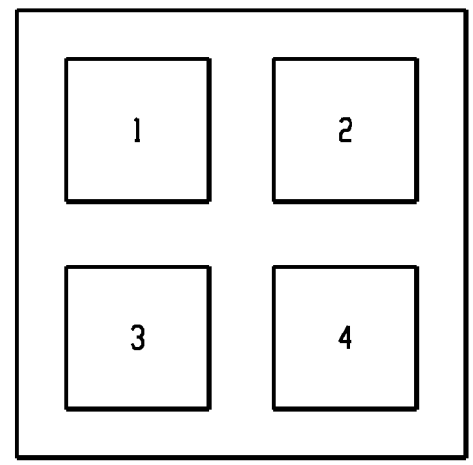

A multi-stream compositing engine can generate a composite video based on a plurality of asynchronously recorded input video streams. FIG. 1 depicts different composite video configurations that may be generated by a multi-stream compositing engine based on input video streams provided from four video capture devices (e.g., a mobile phone video camera, a dedicated video recording device, a camera/camcorder device, a digital camera). Display (a) shows an example display for a portion of an event where one of the video capture devices was recording. A single display sub-portion 102 is positioned within the available display area 104 for the composite video. During replay of the portions of the event where a single video capture device is recording, the input video stream from that single video capture device is displayed in the single display sub-portion 102, which may be sized to occupy a majority of the available display area 104.

Display (b) depicts an example display for a portion of the event where two of the video capture devices were recording. During playback for this portion of the event, the composite display includes two display sub-portions 106, 108 in the available display area 104, where the input streams from the two video capture devices that were recording are displayed side by side. The two display sub-portions 106, 108 may be sized smaller than the single display sub-portion 102 shown in display (a). Display (c) depicts an example display for a portion of the event where three of the video capture devices were recording, and display (d) depicts an example display for a portion of the event where four of the video capture devices were recording. In these examples, the additional input streams are displayed simultaneously, such that all of the recording input video streams are displayed in the composite video simultaneously. The frames may be aligned in a grid formation, where additional rows of frames may be added to the composite video display based on a number of input video streams that are recording during a portion of a recorded event. As input video streams begin, pause, resume, and stop recording throughout the event, the number of display sub-regions included in portions of the composite video increases and decreases accordingly.

The input video streams may be assigned to the frames (e.g., 102, 106, 108) based on a variety of protocols. For example, input video streams may be assigned an index based on the time that those input video streams first began recording the event (e.g., a first input video stream to begin recording is assigned index (1), and a second input video stream to begin recording the event a short time later is assigned index (2)). In such a protocol, input video streams may be assigned according to index numbers, where the input video stream with the lowest index number is assigned to the lowest numbered sub-portion. In another example, an input video stream that has been recording the longest may be assigned to the lowest numbered sub-portion, while other input video streams may be assigned to subsequently numbered sub-portions as those input video streams begin/resume recording. When one input video stream pauses/stops recording, the configuration of sub-portions may adjust accordingly, with remaining recording input video streams moving up one sub-portion number each.

Figure 2:
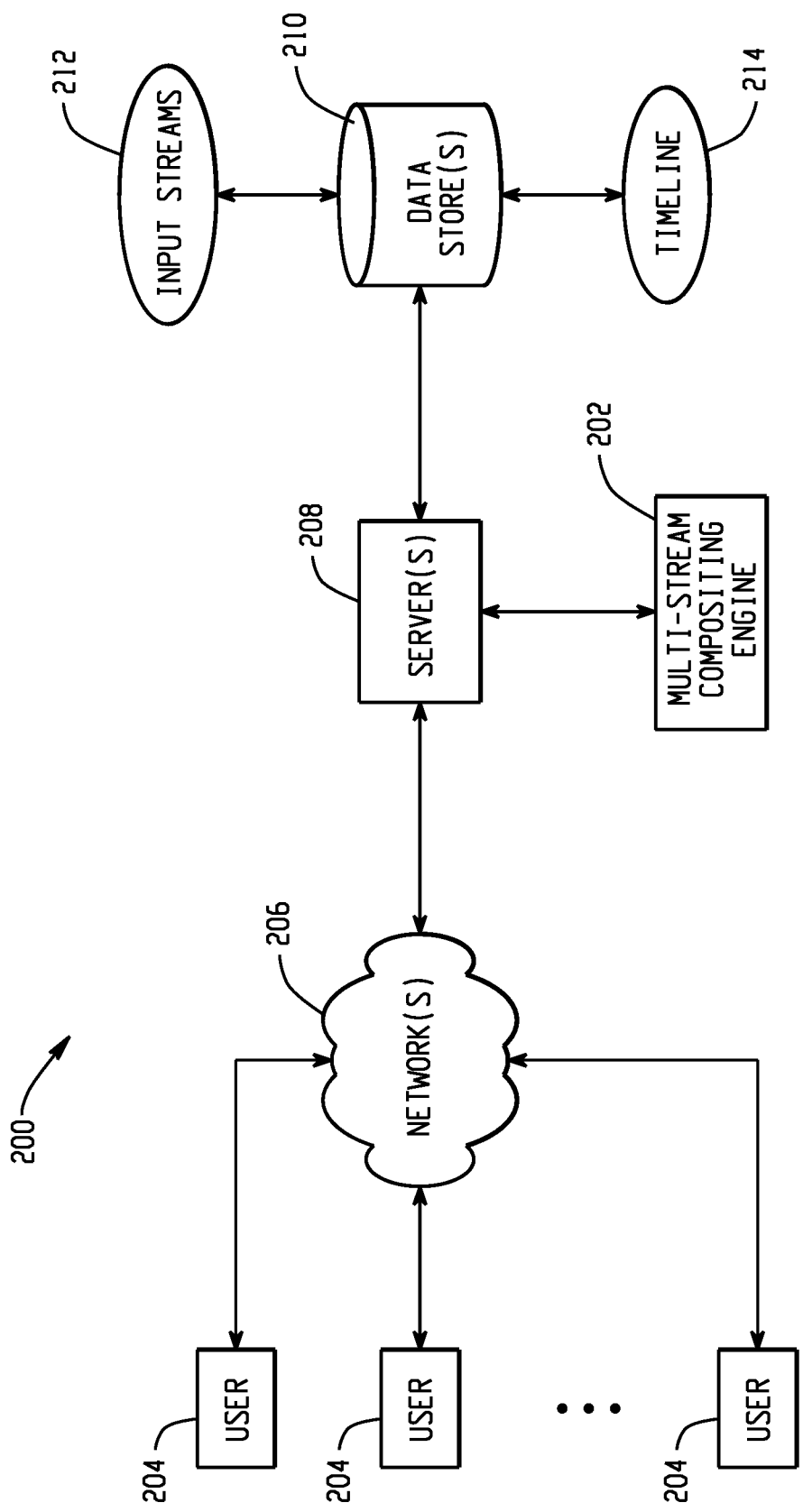
FIG. 2 depicts a computer-implemented system where users can interact with a multi-stream compositing engine for generating a composite video display based on a plurality of asynchronously recorded input video streams.

FIG. 2 depicts a computer-implemented system 200 where users 204 can interact with a multi-stream compositing engine 202 for generating a composite video display based on a plurality of asynchronously recorded input video streams. The multi-stream compositing engine 202 may receive the plurality of input video streams from the users 204. The multi-stream compositing engine 202 may be implemented using a processing system (e.g., one or more computer processors) executing software operations or routines for generating the composite video display. User computers (e.g., desktop computers, laptop computers, tablet computers, smart phones) 204 can interact with the multi-stream compositing engine 202 through a number of ways, such as over one or more networks 206. One or more servers 208 accessible through the networks 206 can host the multi-stream compositing engine 202. It should be understood that the multi-stream compositing engine 202 could also be provided on a stand-alone computer for access by a user 204. The one or more servers 208 may be responsive to one or more data stores 210 for providing input data to the multi-stream compositing engine 202. The one or more data stores 210 may be used to store input video streams 212 and a timeline 214 for tracking starts and stops of input video stream recordings.

Figure 3:
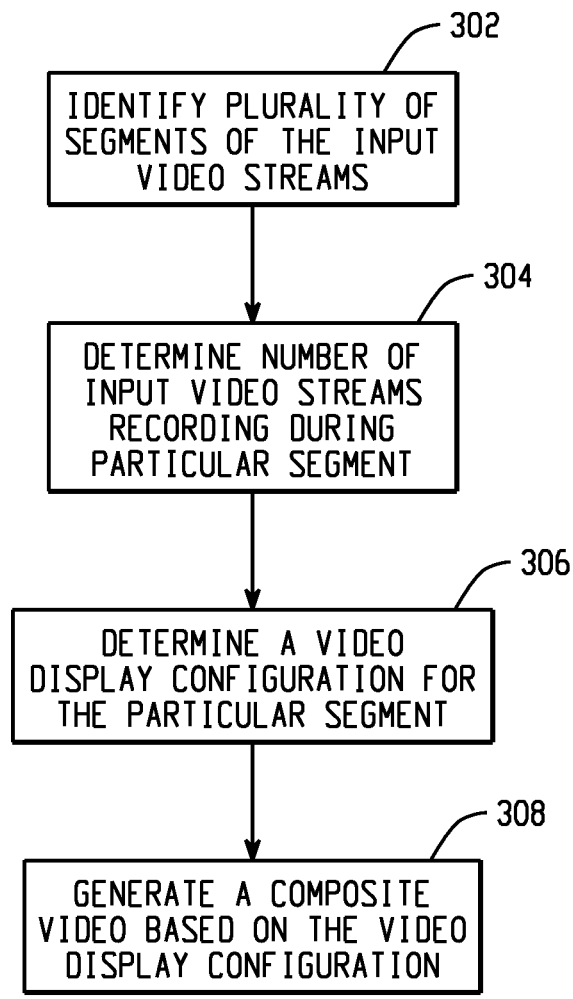
FIG. 3 is a flow diagram that displays example steps that may be implemented by a multi-stream compositing engine in generating a composite video based on a plurality of asynchronously recorded input video streams.

FIG. 3 is a flow diagram that displays example steps that may be implemented by a multi-stream compositing engine in generating a composite video based on a plurality of asynchronously recorded input video streams. At 302, a plurality of segments of the input video streams are identified. A particular segment begins when one of the input video streams starts or stops recording, and the particular segment ends when (e.g., the next time) one of the input video streams starts or stops recording. At 304, a determination is made as to a number of the input video streams that were recording during the particular segment. At 306, a video display configuration is determined for the particular segment based on the number of video streams that were recording. The video display configuration for the particular segment includes a display sub-region for each of the number of video streams that were recording during the particular segment. At 308, a composite video is generated. The composite video includes a portion of video associated with each of the segments. The composite video portion associated with the particular segment is formatted according to the video display configuration and displays the video streams that were recording during the particular segment in the display sub-regions of the video display configuration.

Figure 4:
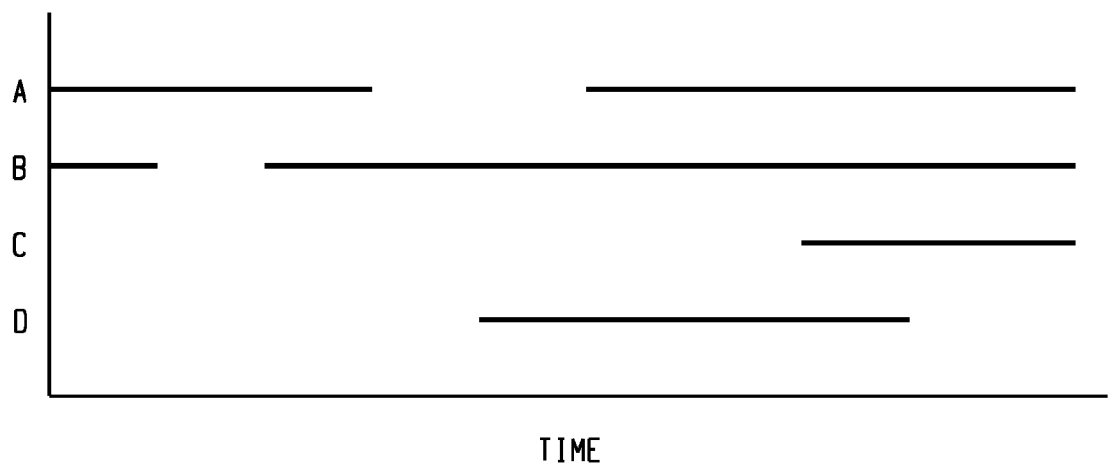
FIG. 4 depicts an example timeline for tracking a plurality of asynchronously recorded input video streams.

FIG. 4 depicts an example timeline for tracking a plurality of asynchronously recorded input video streams. In the example of FIG. 4, four input video streams record at different points throughout the length of the timeline. Input video stream A begins recording at the beginning of the timeline, takes a break from recording about one-third of the way through the timeline, and subsequently records continuously to the end of the timeline. Input video stream B begins recording at the beginning of the timeline, takes a short break from recording, and then records continuously through the end of the timeline. Input video stream C begins recording near the end of the timeline and records to the end of the timeline, and input video stream D records during a middle portion of the timeline.

The input video streams may be aligned with the timeline (e.g., a master timeline) in a variety of ways. For example, each of the input video streams may be aligned by determining a clock skew between a video capture device associated with that input video stream and the multi-stream compositing engine or its associated server. In one example, such a skew may be determined at a time when a video capture device (A) transmits an input video stream to the multi-stream compositing engine. Such transmission could be a live streaming during recording or may be a post recording uploading. A difference between a clock of the video capture device (A) and the clock of the multi-stream compositing engine, a clock skew, is determined (e.g., this difference may include a difference in observed clock values and a lag period experienced in observing the clock values). Time stamps associated with the input video stream recording from that video capture device (A) are adjusted by the multi-stream compositing engine based on the clock skew so that that input video stream is aligned with multi-stream compositing engine time and the timeline. The other input video streams from the other video capture devices (B, C, D) are similarly adjusted by determining clock skews between those video capture devices (B, C, D) and the multi-stream composite engine.

Figure 5:
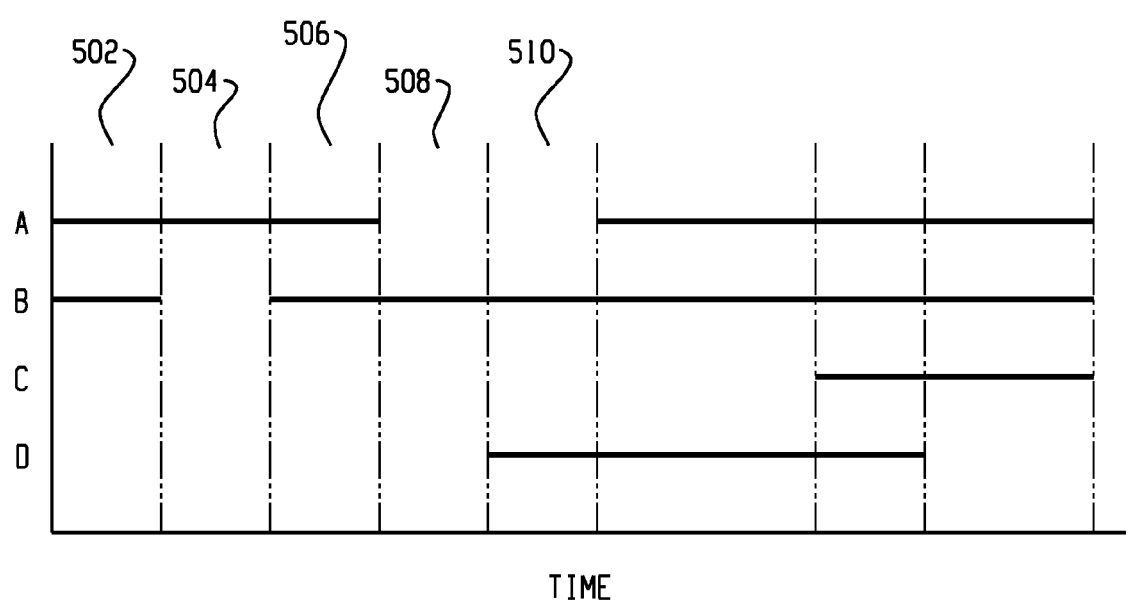
FIG. 5 is a diagram depicting an example identification of segments of the input video streams.

FIG. 5 is a diagram depicting an example identification of segments of the input video streams. A multi-stream compositing engine delineates segments of the input video streams based on starts or stops of recordings of the individual input video streams. A first segment 502 begins when a first input video stream begins recording. In the example of FIG. 5, two input video streams (A), (B) begin recording simultaneously at the start of the first segment 502. When input video stream (B) pauses recording, a second segment 504 begins. When the second input video stream (B) resumes recording, the third segment 506 begins. When the first input video stream (A) pauses recording, the fourth segment 508 begins, and a fifth segment 510 begins when input video stream (D) begins recording. The multi-stream compositing engine identifies segments throughout the timeline, incorporating a segment boundary when one of the input video streams begins, pauses, continues, or ends recording. Such segment boundaries may be stored in a data structure, such as a timeline data structure that identifies start and stop times for the plurality of asynchronously recorded input video streams with respect to the global timeline.

Figure 6:
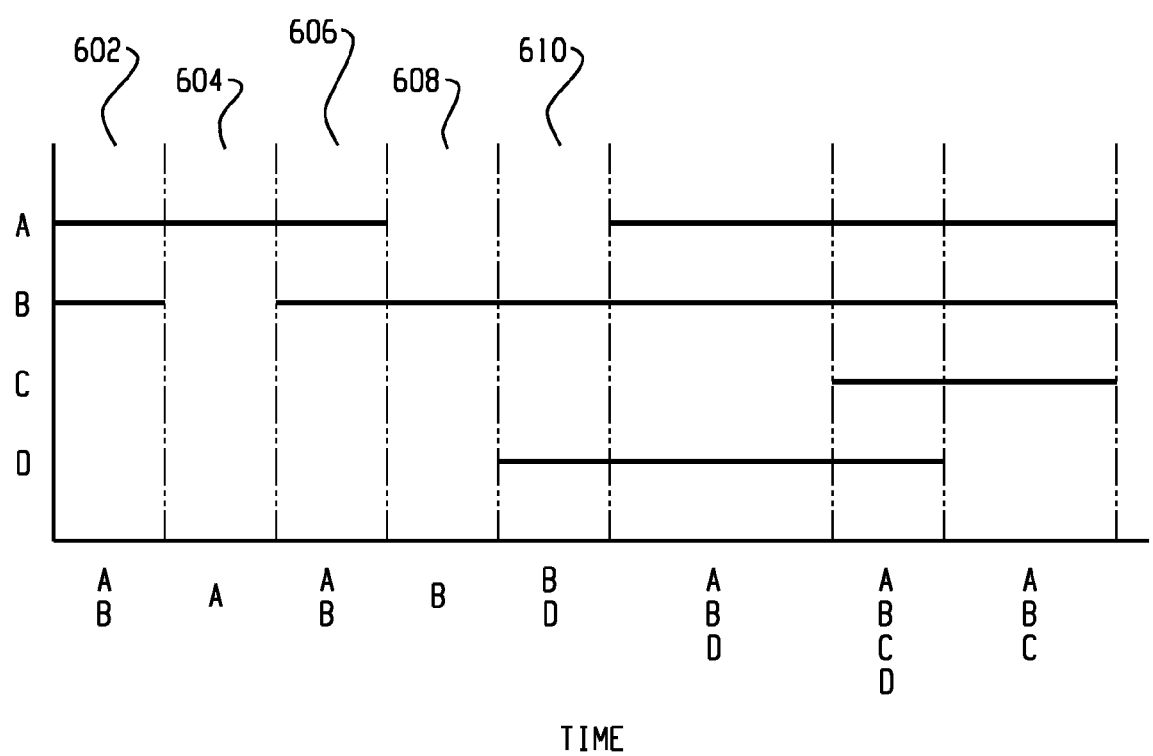
FIG. 6 is a diagram depicting an example determination of a number of input video streams that were recording during particular segments.

FIG. 6 is a diagram depicting an example determination of a number of input video streams that were recording during particular segments. After identifying the segments, the multi-stream compositing engine determines which of the input video streams were recording during each of the segments. In the example of FIG. 6, during the first segment 602, input video streams (A) and (B) were recording, and thus, two input video streams were recording. In the second segment, input video stream (A) was recording, and thus, one input video stream was recording. In the third 606, fourth 608, and fifth 610 segments, input video streams (A) and (B) (2), (B) (1), and (B) and (D) (2) were recording, respectively.

Figure 7:
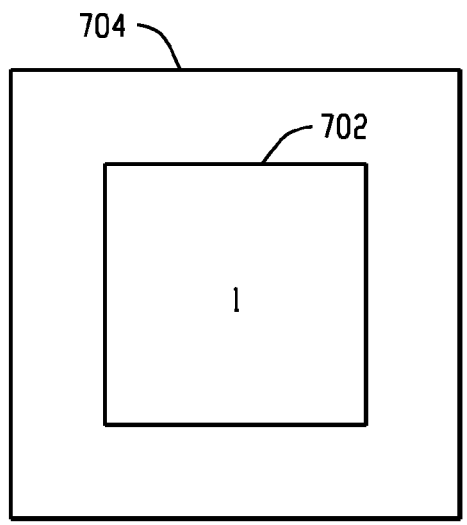
FIG. 7 depicts example video display configurations that may be determined for segments having differing numbers of input video streams recording.
Figure 7:
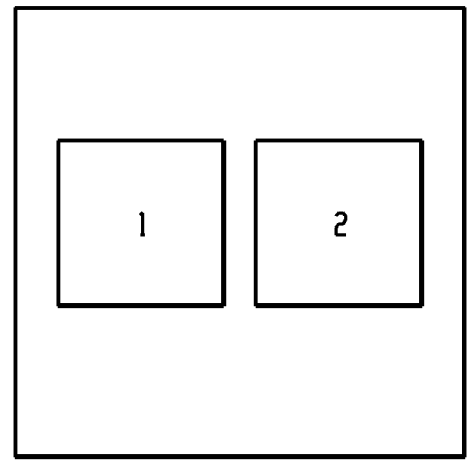
Figure 7:
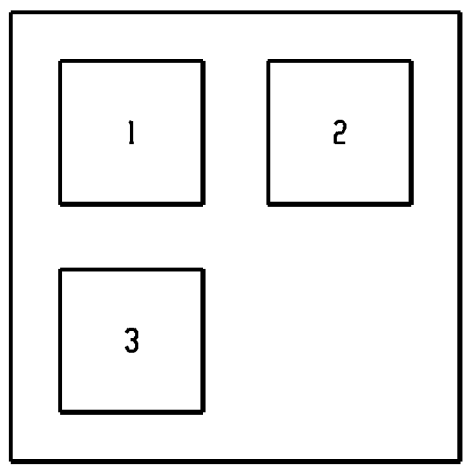
Figure 7:
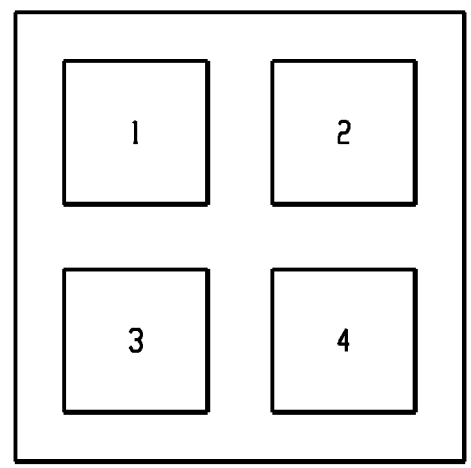

After determining the number of input video streams that were recording during a particular segment, the multi-stream compositing engine determines a video display configuration that is to be used for the particular segment in the composite video. The video display configuration that is determined for the particular segment is based on the number of video streams that were deemed to be recording during the particular segment. FIG. 7 depicts example video display configurations that may be determined for segments having differing numbers of input video streams recording. Display (a) is an example video display configuration that may be selected when one input video stream is recording during a segment. The video display configuration includes one sub-region 702 that occupies a majority of the composite video display 704.

When generating a composite video portion associated with a segment having one input video stream recording, the one input video stream that was recording will be displayed in the composite video in the sub-region 702. Display (b) depicts an example video display configuration that may be selected when two input video streams are recorded during a segment, where the video display configuration includes two sub-regions (e.g., sub-regions that are smaller than the one input video stream sub-region 702) for displaying the two input video streams in the composite video. Similarly, display (c) depicts an example video display configuration that may be selected when three input video streams are recorded during a segment, where the video display configuration includes three sub-regions for displaying the three input video streams in the composite video, and display (d) depicts an example video display configuration that may be selected when four input video streams are recorded during a segment, where the video display configuration includes four sub-regions for displaying the four input video streams in the composite video. Upon selecting video display configurations for the segments of the input video streams, one or more computer memories may be configured to store a composite data structure that is populated with data sufficient to identify the video display configurations for each of the segments.

The determination of a video display configuration having sufficient sub-regions to accommodate the number of input video streams that were recording during a particular segment can be expanded to any number of input video streams. For example, in one implementation, sub-regions are positioned in a substantially square configuration (e.g., 2×2, 3×3, 4×4), where the number of rows of sub-regions is determined according to:

$$\text{Rows} = \text{Round\_up}(\sqrt{n}),$$

where n is the number of input video streams that were recording during the particular segment. In other configurations, the alignment of the sub-regions may not be substantially square (e.g., where letterbox video recording is more amenable to fewer sub-regions being positioned on a row than the total number of rows present).

Figure 8:
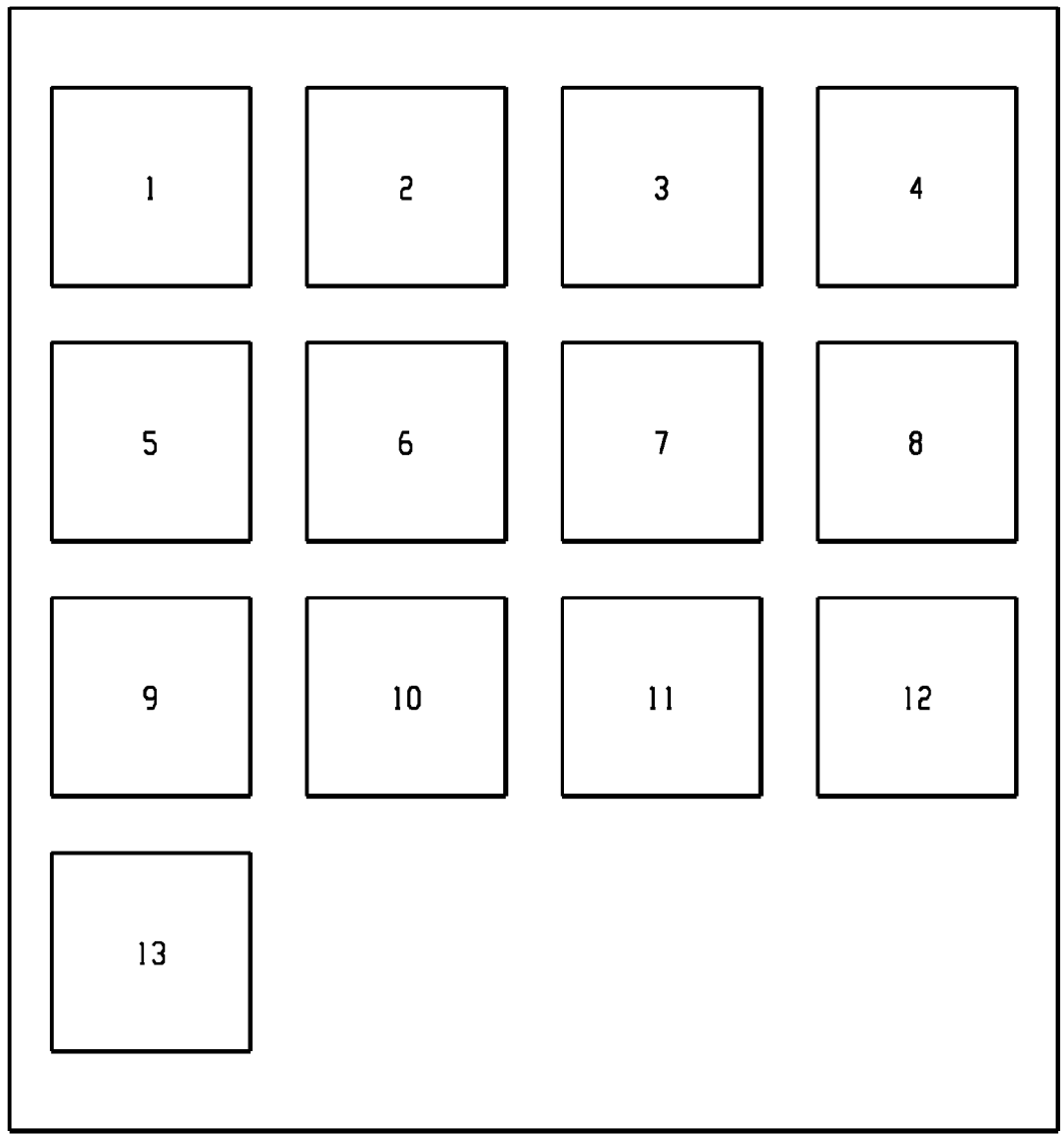
FIG. 8 is a diagram depicting an example video display configuration that may be selected when thirteen input video streams are recording during a particular segment.

FIG. 8 is a diagram depicting an example video display configuration that may be selected when thirteen input video streams are recording during a particular segment. According to the above described formula, Rows=Round_up($\sqrt{n}$), a video display configuration is selected having four rows because the square root of thirteen is approximately 3.6, which when rounded up, directs that a four-row video display configuration should be selected. The video display configuration utilizes the first thirteen sub-regions in generating the composite video for the thirteen input video stream segment.

Figure 9:
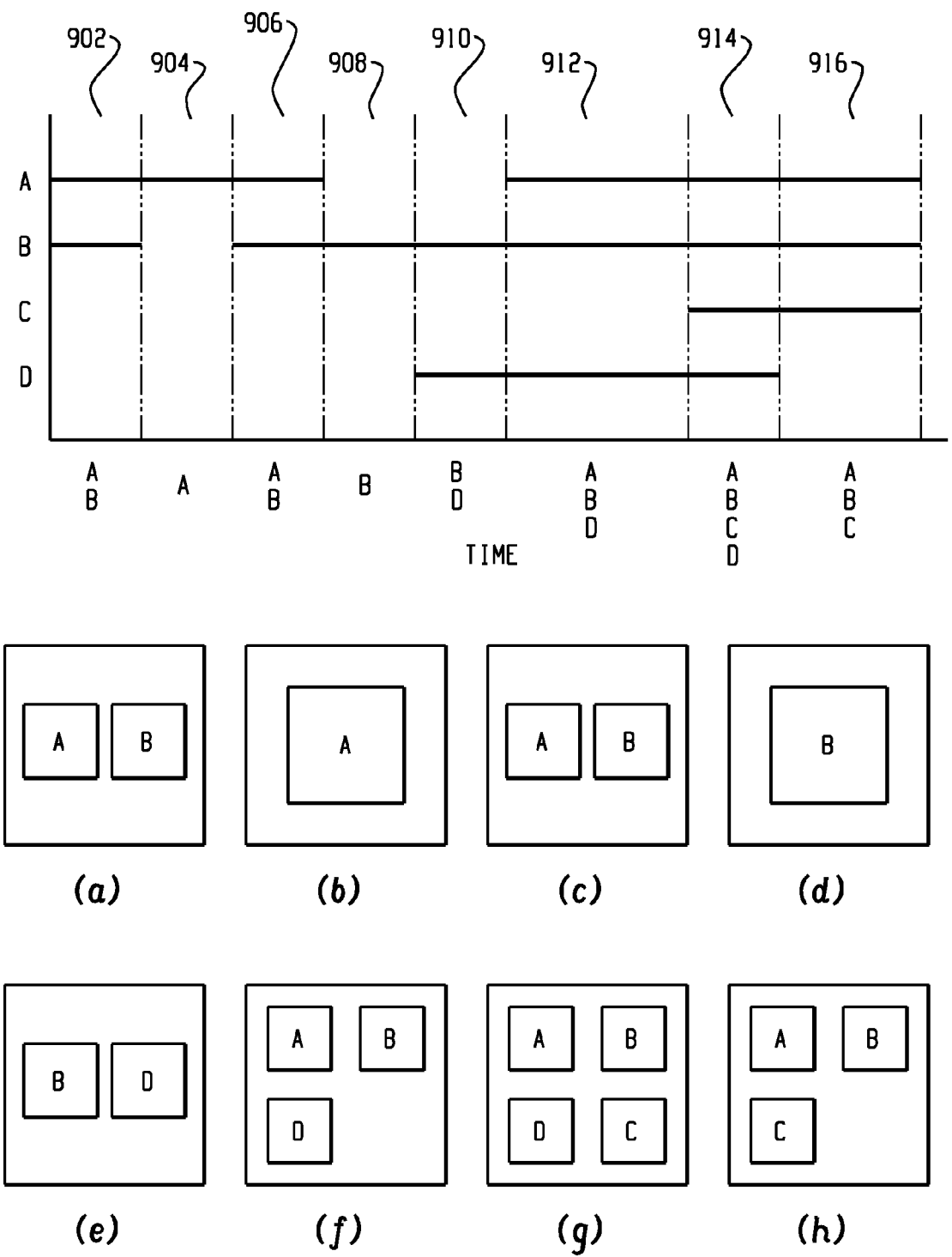
FIG. 9 depicts example video display configurations that may be used for an eight-segment composite video and the assignment of input video streams to the sub-regions of the video display configurations used.

As input video streams begin, pause, resume, and/or finish recording along the timeline, the video display configurations that are selected and used in the composite video may change. FIG. 9 depicts example video display configurations that may be used for an eight-segment composite video and the assignment of input video streams to the sub-regions of the video display configurations used. In the example of FIG. 9, an input video stream to sub-region assignment scheme dictates that input video streams are ordered in the sub-regions based on their order of first-initiation of recording (i.e., A is always positioned before B, which is always positioned before D, which is always positioned before C).

Display (a) depicts a portion of the composite video associated with the first segment 902. During the first segment 902, input video streams (A) and (B) were recording. The multi-stream compositing engine automatically selects the depicted video display configuration for two recording input video streams and assigns input video streams (A) and (B) to the two sub-regions. Display (b) corresponds to the second segment 904, where only stream (A) was recording. Thus, a single sub-region video display configuration is selected for displaying stream (A) in the composite video. Display (c) corresponds with the third segment 906, where streams (A) and (B) were recording; display (d) corresponds with the fourth segment 908, where stream (B) was recording; display (e) corresponds with the fifth segment 910, where streams (B) and (D) were recording; display (f) corresponds with the sixth segment 912, where streams (A), (B) and (D) were recording; display (g) corresponds with the seventh segment 914, where streams (A), (B), (C), and (D) were recording (notice input video stream (D) is positioned before input video stream (C) because input video stream (D) began recording in the fifth segment 910 while input video stream (C) began recording in the seventh segment 914); and display (h) corresponds with the eighth segment 916, where streams (A), (B), and (C) were recording.

Figure 10:
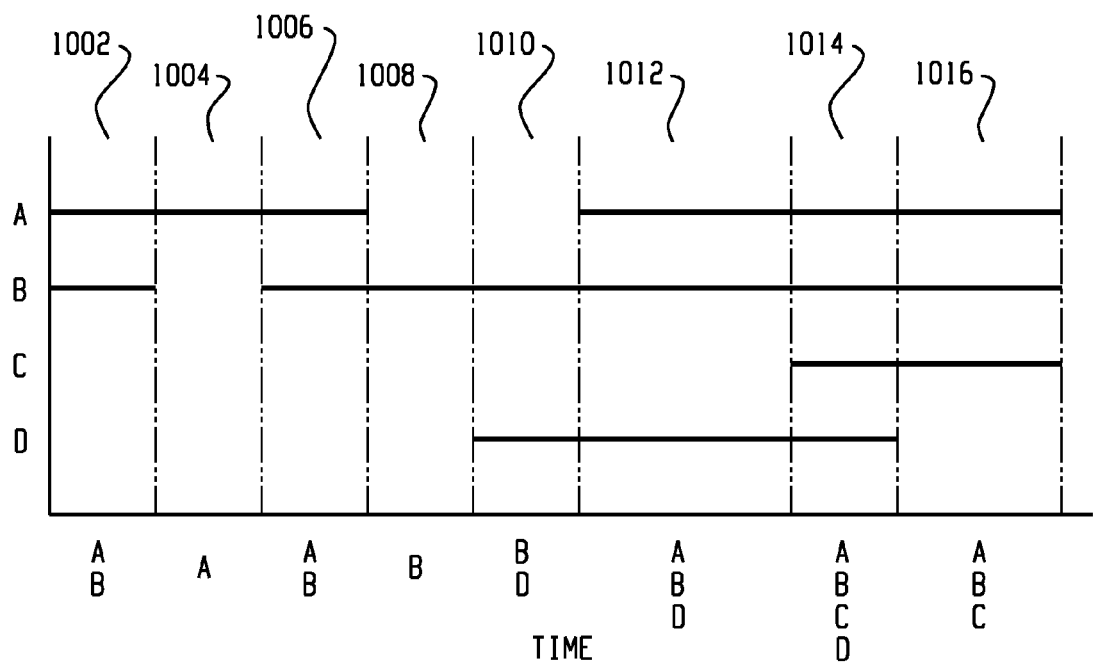
FIG. 10 depicts additional example video display configurations that may be used for an eight-segment composite video and the assignment of input video streams to the sub-regions of the video display configurations used.
Figure 10:
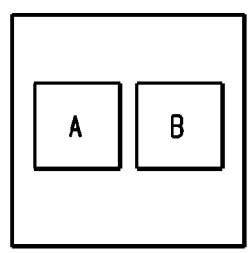
Figure 10:
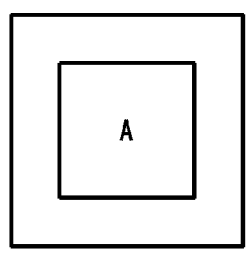
Figure 10:
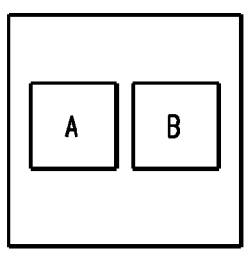
Figure 10:
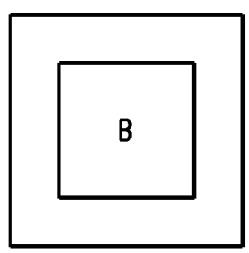
Figure 10:
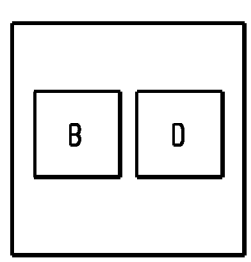
Figure 10:
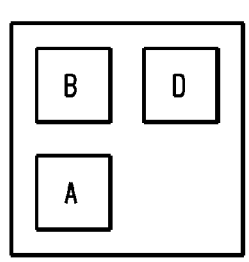
Figure 10:
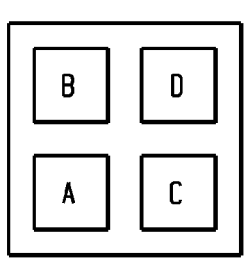
Figure 10:
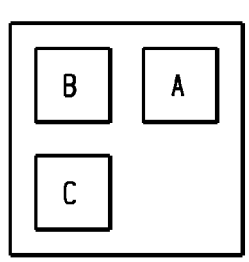

FIG. 10 depicts additional example video display configurations that may be used for an eight-segment composite video and the assignment of input video streams to the sub-regions of the video display configurations used. In the example of FIG. 10, an input video stream to sub-region assignment scheme dictates that input video streams are assigned to sub-regions based on a continuous length of time that an input video stream has been recording. For example, when a particular input video stream stopped recording at a segment transition, the input video streams that remained recording "bump up" one position. If the particular input video stream resumes recording, the particular input video stream would be positioned in a last available sub-region.

Display (a) depicts a portion of the composite video associated with the first segment 1002. During the first segment 1002, input video streams (A) and (B) were recording. The multi-stream compositing engine automatically selects the depicted video display configuration for two recording input video streams and assigns input video streams (A) and (B) to the two sub-regions. Display (b) corresponds to the second segment 1004, where only stream (A) was recording. Thus, a single sub-region video display configuration is selected for displaying stream (A) in the composite video. Display (c) corresponds with the third segment 1006, where streams (A) and (B) were recording; display (d) corresponds with the fourth segment 1008, where stream (B) was recording; display (e) corresponds with the fifth segment 1010, where streams (B) and (D) were recording; display (f) corresponds with the sixth segment 1012, where streams (A), (B) and (D) were recording (notice input video stream (B) is positioned first, having been recording since the third segment 1006, while input video stream (A) is positioned in the third position, having just resumed recording in the sixth segment 1012); display (g) corresponds with the seventh segment 1014, where streams (A), (B), (C), and (D) were recording; and display (h) corresponds with the eighth segment 1016, where streams (A), (B), and (C) were recording.

The concepts of this disclosure have been described in the context of examples, and the scope of the disclosure includes many additional examples. For example, certain multi-stream composite video generation functionality may be provided to one or more video capture devices as a downloadable application (e.g., for free or for a fee). In one configuration, a video party may be set up by a host person operating a downloadable application on a host video capture device. The host video capture device (e.g., a smart-phone), may be used to send invitations to client participants ("the crew") via applications (the same host application or a client application)

operating on their client video capture devices. Upon initiation of the session (e.g., upon sending of the invitations, at an identified start time, upon a signal from the host), the host video capture device and the client video capture devices are free to begin recording input video streams. Upon completion of recording, the client video capture devices may transmit their input video streams to the host video capture device (e.g., based on a user command, automatically upon close of an application, based on a signal from a host), which may perform the operations of a multi-stream compositing engine to generate the composite video. In an alternate configuration, both the client video capture devices and the host video capture devices may transmit their input video streams to a server that performs the multi-stream compositing engine operations.

As another example, once a composite video has been created, it can be shared via e-mail, text message, or social media posting (e.g., Facebook, MySpace, Twitter, YouTube, StreamWeaver). In another configuration, a composite video can be broadcast live via a website, social media outlet, or otherwise, where each of the input video streams transmits live to the multi-stream compositing engine, which constructs and transmits/streams the composite video live.

Figure 11:
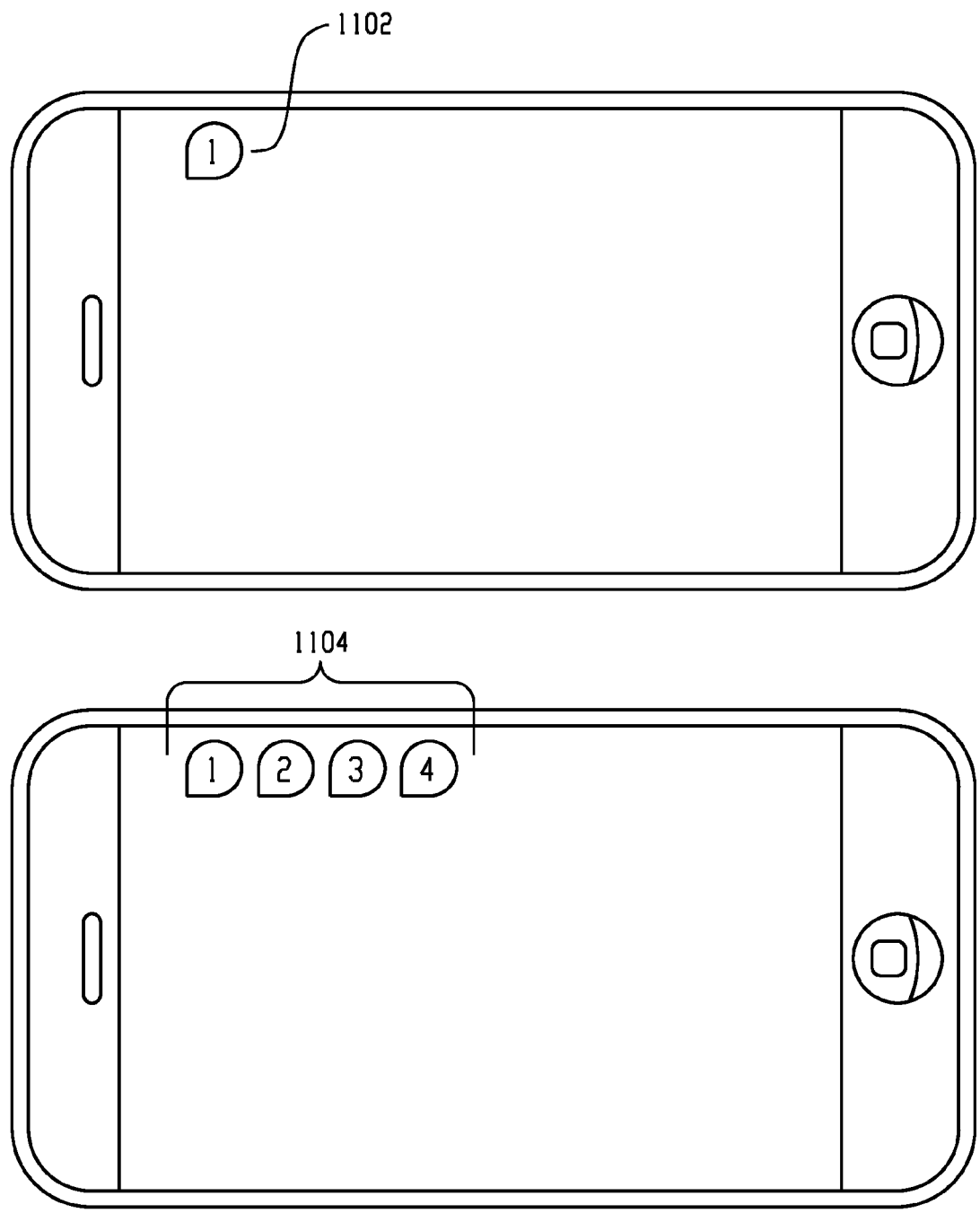
FIG. 11 depicts recording indicators that may be provided by a video capturing device.

As another example, FIG. 11 depicts recording indicators that may be provided by a video capturing device. In FIG. 11, an indicator 1102 may be provided to a user via a video capture device that indicates the recording status of the video capture device. A video capture device may further include one or more indicators 1104 that display the current recording status of other video capture devices (e.g., of crew members).

As a further example, one of the input capture devices may function as a still-frame camera, in contrast with a video recorder. Such a still frame camera can provide still photo images to the multi-stream compositing engine, where a still photo image is treated as an input video stream of a predefined duration and can be provided for that predefined duration in a sub-region of a video display configuration for a segment.

As another example, a composite video may be generated by a multi-stream compositing engine of a licensed recording event. For example, some events may limit attendees' rights to perform certain recording activities, such as recording video of the event (e.g., concerts, plays, sporting events). However, some events may opt to relax certain of these restrictions, such as in exchange for a fee or as part of a promotion. In one example, a host person may register with an event holder and pay a fee in exchange for being issued permission or credentials to host a multi-stream composite video recording session with friends or others at the event. Having permission, the composite recording that is generated may be streamed live, such as via a social media site, or uploaded at a later time to a video hosting site. Permissions may also be negotiated by a third party, such as a party providing a multi-stream compositing application for a smart phone. For example, certain events may be deemed open for all to record and produce composite videos based on negotiations between the application provider and the event holder.

Figure 12A:
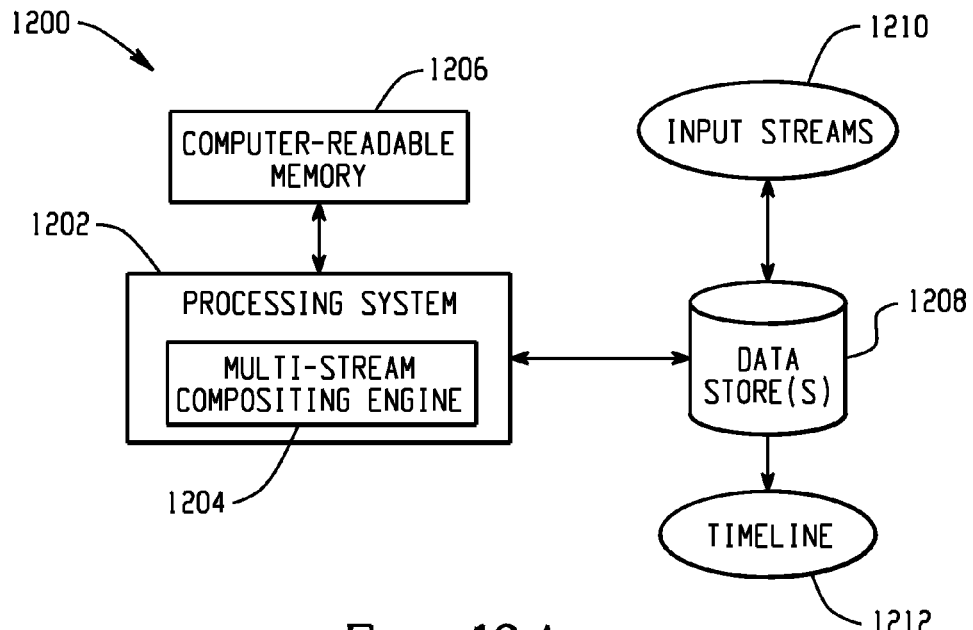
FIGS. 12A, 12B, and 12C depict example systems for use in implementing a multi-stream compositing engine.
Figure 12B:
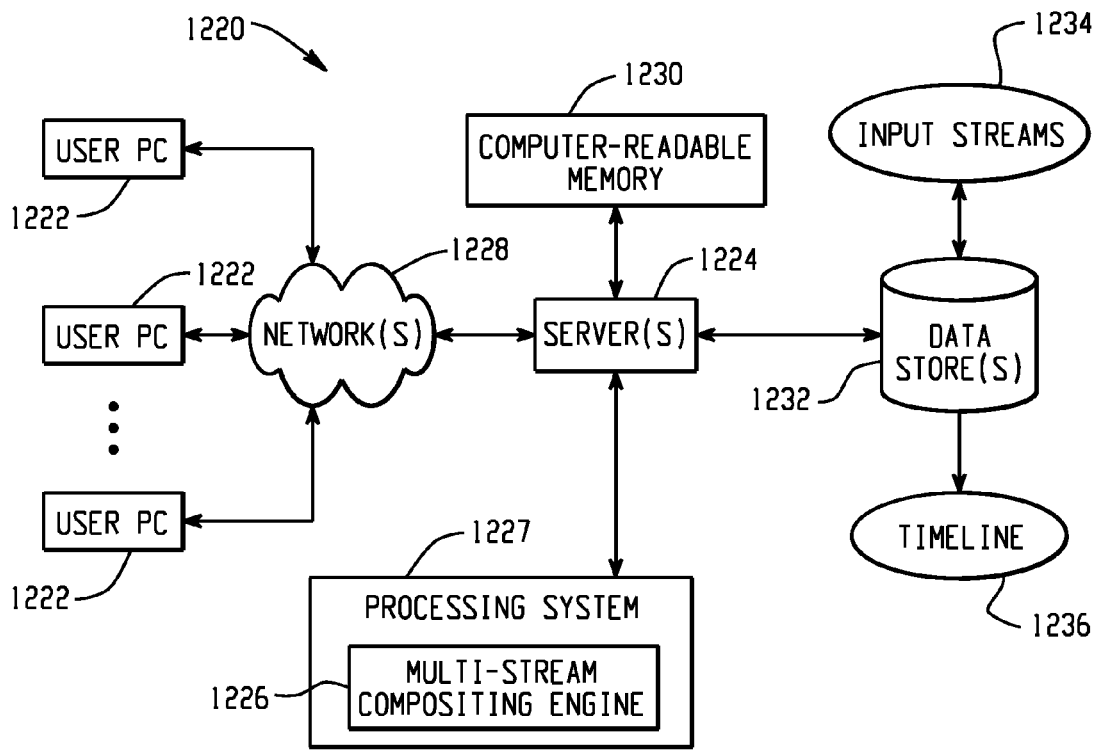
Figure 12C:
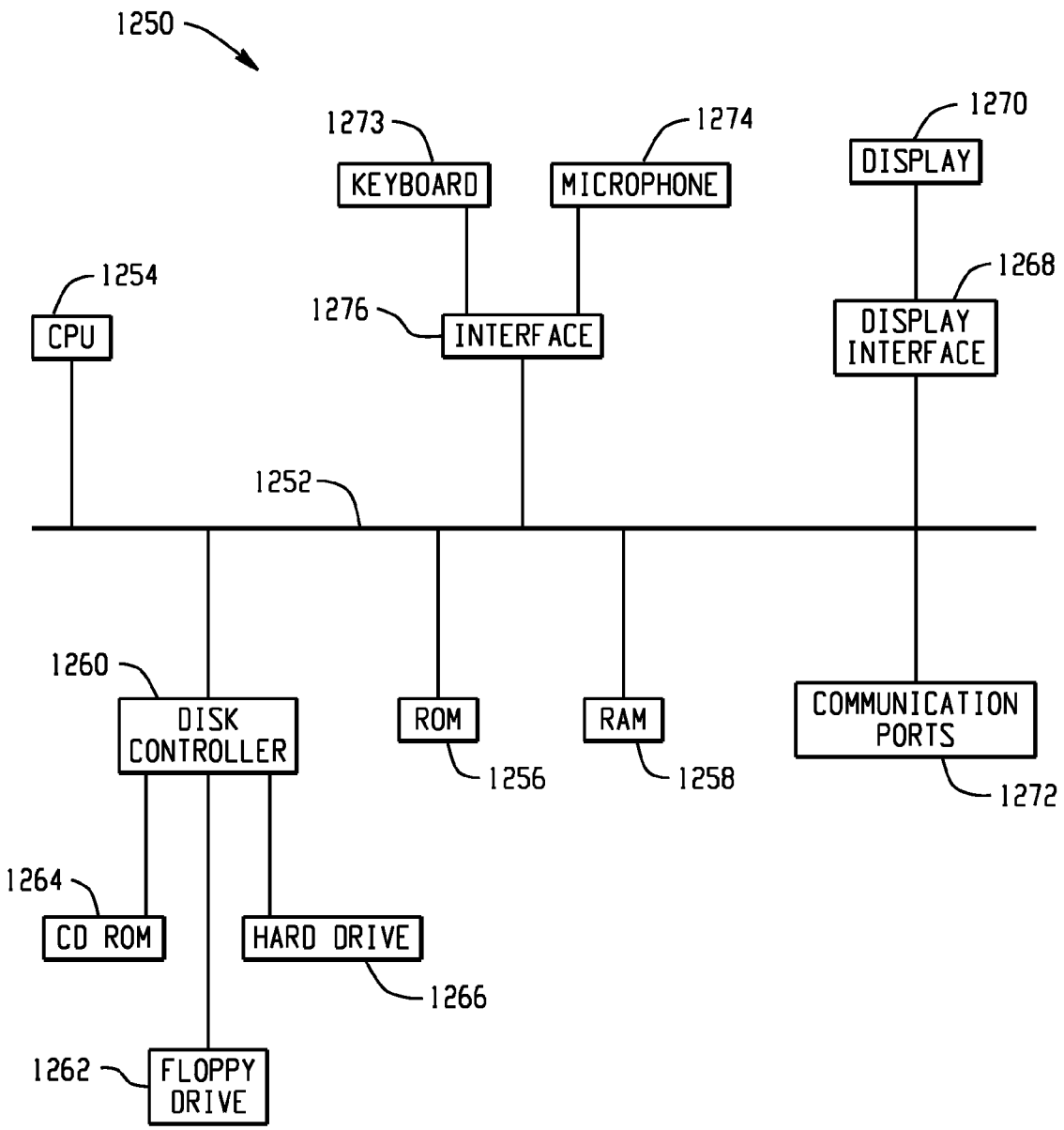

As a further example, FIGS. 12A, 12B, and 12C depict example systems for use in implementing a multi-stream compositing engine. For example, FIG. 12A depicts an exemplary system 1200 that includes a standalone computer architecture where a processing system 1202 (e.g., one or more computer processors located in a given computer or in multiple computers that may be separate and distinct from one another) includes a multi-stream compositing engine 1204 being executed on it. The processing system 1202 has access to a computer-readable memory 1206 in addition to one or more data stores 1208. The one or more data stores 1208 may include input streams 1210 as well as a timeline 1212.

FIG. 12B depicts a system 1220 that includes a client server architecture. One or more user PCs 1222 access one or more servers 1224 running a multi-stream compositing engine 1226 on a processing system 1227 via one or more networks 1228. The one or more servers 1224 may access a computer readable memory 1230 as well as one or more data stores 1232. The one or more data stores 1232 may contain input streams 1234 as well as a timeline 1236.

FIG. 12C shows a block diagram of exemplary hardware for a standalone computer architecture 1250, such as the architecture depicted in FIG. 12A that may be used to contain and/or implement the program instructions of system embodiments of the present invention. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1256 and random access memory (RAM) 1258, may be in communication with the processing system 1254 and may contain one or more programming instructions for performing the method of generating a composite video. Optionally, program instructions may be stored on a non-transitory computer readable storage medium such as a magnetic disk, optical disk, recordable memory device, flash memory, or other physical storage medium.

A disk controller 1260 interfaces one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1252 to be displayed on a display 1270 in audio, graphic, or alphanumeric format. Communication with external devices may optionally occur using various communication ports 1272.

In addition to the standard computer-type components, the hardware may also include data input devices, such as a keyboard 1273, or other input device 1274, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of generating a composite video based on a plurality of asynchronously recorded input video streams, comprising:
   time aligning a plurality of input video streams, wherein aligning an input video stream includes:
      determining a clock skew between a time measurement associated with a first video stream and a master time measurement; and
      aligning the first video stream with a master timeline based on the clock skew;
   identifying a plurality of segments of the input video streams, wherein a particular segment begins when one of the input video streams starts or stops recording, and wherein the particular segment ends when one of the input video streams starts or stops recording;
   determining a number of the input video streams that were recording during the particular segment;
   determining a video display configuration for the particular segment based on the number of video streams that were recording, wherein the video display configuration includes a display sub-region for each of the number of video streams that was recording; and
   generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration.

2. The method of claim 1, wherein the video streams that were recording during the particular segment are assigned to display sub-regions based on which of the video streams began recording first.

3. The method of claim 1, wherein the input video streams are recorded over a duration, wherein at least one of the video streams starts recording and stops recording multiple times during the duration.

4. The method of claim 1, wherein the input video streams are transmitted to a server from a plurality of mobile video capture devices;
   wherein the server is configured to generate the composite video using the input video streams.

5. The method of claim 4, wherein the mobile video capture devices are mobile telephones.

6. The method of claim 4, wherein the mobile video capture devices include one or more of a tablet computer, a dedicated video recording device, a camera, a camcorder, or a smart phone.

7. The method of claim 1, wherein the steps of the method are performed using a downloadable application.

8. The method of claim 1, wherein the steps of the method are performed using one or more data processors.

9. The method of claim 1, wherein at least one of the input video streams is transmitted to a server from a still-frame camera, and wherein the still-frame camera transmits a still photo image as a video stream.

10. A computer-implemented method of generating a composite video based on a plurality of asynchronously recorded input video streams, comprising:
   identifying a plurality of segments of the input video streams, wherein a particular segment begins when one of the input video streams starts or stops recording, and wherein the particular segment ends when one of the input video streams starts or stops recording;
   determining a number of the input video streams that were recording during the particular segment;
   determining a video display configuration for the particular segment based on the number of video streams that were recording, wherein the video display configuration includes a display sub-region for each of the number of video streams that was recording; and
   generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein a number of rows of display sub-regions of the video display configuration is determined according to:

$$\text{Round\_up}(\sqrt{n})$$

wherein n is the number of input video streams that were recording during the particular segment.

11. A computer-implemented method of generating a composite video based on a plurality of asynchronously recorded input video streams, comprising:
- identifying a plurality of segments of the input video streams, wherein a particular segment begins when one of the input video streams starts or stops recording, and wherein the particular segment ends when one of the input video streams starts or stops recording;
- determining a number of the input video streams that were recording during the particular segment;
- determining a video display configuration for the particular segment based on the number of video streams that were recording, wherein the video display configuration includes a display sub-region for each of the number of video streams that was recording; and
- generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the video streams that were recording during the particular segment are assigned to display sub-regions based on which of the video streams that were recording had been recording the longest.

12. A computer-implemented method of generating a composite video based on a plurality of asynchronously recorded input video streams, comprising:
- identifying a plurality of segments of the input video streams, wherein a particular segment begins when one of the input video streams starts or stops recording, and wherein the particular segment ends when one of the input video streams starts or stops recording;
- determining a number of the input video streams that were recording during the particular segment;
- determining a video display configuration for the particular segment based on the number of video streams that were recording, wherein the video display configuration includes a display sub-region for each of the number of video streams that was recording; and
- generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the composite video includes a first portion, wherein the first portion includes a first video display configuration having x number of display sub-regions;
- wherein the composite video includes a second portion, wherein the second portion includes a second video display configuration having y number of display sub-regions, wherein x is not equal to y.

13. A computer-implemented method of generating a composite video based on a plurality of asynchronously recorded input video streams, comprising:
- identifying a plurality of segments of the input video streams, wherein a particular segment begins when one of the input video streams starts or stops recording, and wherein the particular segment ends when one of the input video streams starts or stops recording;
- determining a number of the input video streams that were recording during the particular segment;
- determining a video display configuration for the particular segment based on the number of video streams that were recording, wherein the video display configuration includes a display sub-region for each of the number of video streams that was recording; and
- generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the input video streams are transmitted to a server from a plurality of mobile video capture devices, wherein the server is configured to generate the composite video using the input video streams, wherein the input video streams are transmitted to the server after the input video streams are recorded.

14. A computer-implemented method of generating a composite video based on a plurality of asynchronously recorded input video streams, comprising:
- identifying a plurality of segments of the input video streams, wherein a particular segment begins when one of the input video streams starts or stops recording, and wherein the particular segment ends when one of the input video streams starts or stops recording;
- determining a number of the input video streams that were recording during the particular segment;
- determining a video display configuration for the particular segment based on the number of video streams that were recording, wherein the video display configuration includes a display sub-region for each of the number of video streams that was recording; and
- generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the input video streams are transmitted to a server from a plurality of mobile video capture devices, wherein the server is configured to generate the composite video using the input video streams, wherein the input video streams are transmitted to the server contemporaneously with the recording of the input video streams.

15. The method of claim 14, wherein the server generates and transmits the composite video contemporaneously with the recording of the input video streams.

16. A computer-implemented system for generating a composite video based on a plurality of asynchronously recorded input video streams, comprising:
- one or more computer memories for storing a timeline data structure, wherein the timeline data structure includes:
  - identifications of stop and start times for the plurality of asynchronously recorded input video streams with respect to a global timeline;
- a data processor configured to:
  - time align a plurality of input video streams, wherein aligning an input video stream includes:
    - determining a clock skew between a time measurement associated with a first video stream and a master time measurement; and
    - aligning the first video stream with a master timeline based on the clock skew;

identify a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display region for each of the number of video streams that was recording; and wherein the one or more computer memories is further configured to store a composite video data structure, wherein the composite video data structure is configured to store data sufficient to identify video display configurations for each of the plurality of segments including the particular segment.

17. A computer-implemented system for generating a composite video based on a plurality of asynchronously recorded input video streams, comprising:

one or more data processors;

one or more computer-readable mediums encoded with instructions for commanding the one or more data processors to execute steps that include:

time aligning a plurality of input video streams, wherein aligning an input video stream includes:

determining a clock skew between a time measurement associated with a first video stream and a master time measurement; and aligning the first video stream with a master timeline based on the clock skew;

identifying a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display sub-region for each of the number of video streams that was recording; and generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration.

18. A non-transitory computer-readable medium encoded with instructions for commanding one or more data processors to execute steps for generating a composite video based on a plurality of asynchronously recorded input video streams, the steps comprising:

time aligning a plurality of input video streams, wherein aligning an input video stream includes:

determining a clock skew between a time measurement associated with a first video stream and a master time measurement; and aligning the first video stream with a master timeline based on the clock skew;

identifying a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display sub-region for each of the number of video streams that was recording; and generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration.

19. A computer-implemented system for generating a composite video based on a plurality of asynchronously recorded input video streams, comprising:

one or more computer memories for storing a timeline data structure, wherein the timeline data structure includes:

identifications of stop and start times for the plurality of asynchronously recorded input video streams with respect to a global timeline;

a data processor configured to:

identify a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display region for each of the number of video streams that was recording; and wherein the one or more computer memories is further configured to store a composite video data structure, wherein the composite video data structure is configured to store data sufficient to identify video display configurations for each of the plurality of segments including the particular segment, wherein a number of rows of display sub-regions of the video display configuration is determined according to:

$$\text{Round\_up}(\sqrt{n});$$

wherein n is the number of input video streams that were recording during the particular segment.

20. A computer-implemented system for generating a composite video based on a plurality of asynchronously recorded input video streams, comprising:

one or more data processors;

one or more computer-readable mediums encoded with instructions for commanding the one or more data processors to execute steps that include:

identifying a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display sub-region for each of the number of video streams that was recording; and generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein a number of rows of display sub-regions of the video display configuration is determined according to:

$$\text{Round\_up}(\sqrt{n});$$

wherein n is the number of input video streams that were recording during the particular segment.

21. A non-transitory computer-readable medium encoded with instructions for commanding one or more data processors to execute steps for generating a composite video based on a plurality of asynchronously recorded input video streams, the steps comprising:
    identifying a plurality of segments of the input video streams, wherein a particular segment begins when one of the input video streams starts or stops recording, and wherein the particular segment ends when one of the input video streams starts or stops recording;
    determining a number of the input video streams that were recording during the particular segment;
    determining a video display configuration for the particular segment based on the number of video streams that were recording, wherein the video display configuration includes a display sub-region for each of the number of video streams that was recording; and
    generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein a number of rows of display sub-regions of the video display configuration is determined according to:

$$\text{Round\_up}(\sqrt{n});$$

wherein n is the number of input video streams that were recording during the particular segment.

22. A computer-implemented system for generating a composite video based on a plurality of asynchronously recorded input video streams, comprising:
    one or more computer memories for storing a timeline data structure, wherein the timeline data structure includes:
        identifications of stop and start times for the plurality of asynchronously recorded input video streams with respect to a global timeline;
    a data processor configured to:
        identify a plurality of segments of the input video streams, wherein a particular segment begins when one of the input video streams starts or stops recording, and wherein the particular segment ends when one of the input video streams starts or stops recording;
        determining a number of the input video streams that were recording during the particular segment;
        determining a video display configuration for the particular segment based on the number of video streams that were recording, wherein the video display configuration includes a display region for each of the number of video streams that was recording; and
    wherein the one or more computer memories is further configured to store a composite video data structure, wherein the composite video data structure is configured to store data sufficient to identify video display configurations for each of the plurality of segments including the particular segment, wherein the video streams that were recording during the particular segment are assigned to display sub-regions based on which of the video streams that were recording had been recording the longest.

23. A computer-implemented system for generating a composite video based on a plurality of asynchronously recorded input video streams, comprising:
    one or more data processors;
    one or more computer-readable mediums encoded with instructions for commanding the one or more data processors to execute steps that include:
    identifying a plurality of segments of the input video streams, wherein a particular segment begins when one of the input video streams starts or stops recording, and wherein the particular segment ends when one of the input video streams starts or stops recording;
    determining a number of the input video streams that were recording during the particular segment;
    determining a video display configuration for the particular segment based on the number of video streams that were recording, wherein the video display configuration includes a display sub-region for each of the number of video streams that was recording; and
    generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the video streams that were recording during the particular segment are assigned to display sub-regions based on which of the video streams that were recording had been recording the longest.

24. A non-transitory computer-readable medium encoded with instructions for commanding one or more data processors to execute steps for generating a composite video based on a plurality of asynchronously recorded input video streams, the steps comprising:
    identifying a plurality of segments of the input video streams, wherein a particular segment begins when one of the input video streams starts or stops recording, and wherein the particular segment ends when one of the input video streams starts or stops recording;
    determining a number of the input video streams that were recording during the particular segment;
    determining a video display configuration for the particular segment based on the number of video streams that were recording, wherein the video display configuration includes a display sub-region for each of the number of video streams that was recording; and
    generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the video streams that were recording during the particular segment are assigned to display sub-regions based on which of the video streams that were recording had been recording the longest.

25. A computer-implemented system for generating a composite video based on a plurality of asynchronously recorded input video streams, comprising:
one or more computer memories for storing a timeline data structure, wherein the timeline data structure includes:
identifications of stop and start times for the plurality of asynchronously recorded input video streams with respect to a global timeline;
a data processor configured to:
identify a plurality of segments of the input video streams, wherein a particular segment begins when one of the input video streams starts or stops recording, and wherein the particular segment ends when one of the input video streams starts or stops recording;
determining a number of the input video streams that were recording during the particular segment;
determining a video display configuration for the particular segment based on the number of video streams that were recording, wherein the video display configuration includes a display region for each of the number of video streams that was recording; and
wherein the one or more computer memories is further configured to store a composite video data structure, wherein the composite video data structure is configured to store data sufficient to identify video display configurations for each of the plurality of segments including the particular segment;
wherein the composite video includes a first portion, wherein the first portion includes a first video display configuration having x number of display sub-regions;
wherein the composite video includes a second portion, wherein the second portion includes a second video display configuration having y number of display sub-regions, wherein x is not equal to y.

26. A computer-implemented system for generating a composite video based on a plurality of asynchronously recorded input video streams, comprising:
one or more data processors;
one or more computer-readable mediums encoded with instructions for commanding the one or more data processors to execute steps that include:
identifying a plurality of segments of the input video streams, wherein a particular segment begins when one of the input video streams starts or stops recording, and wherein the particular segment ends when one of the input video streams starts or stops recording;
determining a number of the input video streams that were recording during the particular segment;
determining a video display configuration for the particular segment based on the number of video streams that were recording, wherein the video display configuration includes a display sub-region for each of the number of video streams that was recording; and
generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration;
wherein the composite video includes a first portion, wherein the first portion includes a first video display configuration having x number of display sub-regions;
wherein the composite video includes a second portion, wherein the second portion includes a second video display configuration having y number of display sub-regions, wherein x is not equal to y.

27. A non-transitory computer-readable medium encoded with instructions for commanding one or more data processors to execute steps for generating a composite video based on a plurality of asynchronously recorded input video streams, the steps comprising:
identifying a plurality of segments of the input video streams, wherein a particular segment begins when one of the input video streams starts or stops recording, and wherein the particular segment ends when one of the input video streams starts or stops recording;
determining a number of the input video streams that were recording during the particular segment;
determining a video display configuration for the particular segment based on the number of video streams that were recording, wherein the video display configuration includes a display sub-region for each of the number of video streams that was recording; and
generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration;
wherein the composite video includes a first portion, wherein the first portion includes a first video display configuration having x number of display sub-regions;
wherein the composite video includes a second portion, wherein the second portion includes a second video display configuration having y number of display sub-regions, wherein x is not equal to y.

28. A computer-implemented system for generating a composite video based on a plurality of asynchronously recorded input video streams, comprising:
one or more computer memories for storing a timeline data structure, wherein the timeline data structure includes:
identifications of stop and start times for the plurality of asynchronously recorded input video streams with respect to a global timeline;
a data processor configured to:
identify a plurality of segments of the input video streams, wherein a particular segment begins when one of the input video streams starts or stops recording, and wherein the particular segment ends when one of the input video streams starts or stops recording;
determining a number of the input video streams that were recording during the particular segment;
determining a video display configuration for the particular segment based on the number of video streams that were recording, wherein the video display configuration includes a display region for each of the number of video streams that was recording; and
wherein the one or more computer memories is further configured to store a composite video data structure, wherein the composite video data structure is configured to store data sufficient to identify video display configurations for each of the plurality of segments including the particular segment, wherein the input video streams are transmitted to a server from a plurality of mobile video capture devices, wherein the server is configured to generate the composite video using the input video streams, wherein the input video streams are transmitted to the server after the input video streams are recorded or contemporaneously with the recording of the input video streams.

29. A computer-implemented system for generating a composite video based on a plurality of asynchronously recorded input video streams, comprising:

one or more data processors;

one or more computer-readable mediums encoded with instructions for commanding the one or more data processors to execute steps that include:

identifying a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display sub-region for each of the number of video streams that was recording; and generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the input video streams are transmitted to a server from a plurality of mobile video capture devices, wherein the server is configured to generate the composite video using the input video streams, wherein the input video streams are transmitted to the server after the input video streams are recorded or contemporaneously with the recording of the input video streams.

30. A non-transitory computer-readable medium encoded with instructions for commanding one or more data processors to execute steps for generating a composite video based on a plurality of asynchronously recorded input video streams, the steps comprising:

identifying a plurality of segments of the input video streams, wherein a particular segment begins when one of the input video streams starts or stops recording, and wherein the particular segment ends when one of the input video streams starts or stops recording;

determining a number of the input video streams that were recording during the particular segment;

determining a video display configuration for the particular segment based on the number of video streams that were recording, wherein the video display configuration includes a display sub-region for each of the number of video streams that was recording; and generating a composite video, wherein the composite video includes a portion of video associated with each of the segments, wherein the composite video portion associated with the particular segment is formatted according to the video display configuration and displays the video streams that were recording during the particular segment in the display sub-regions of the video display configuration, wherein the input video streams are transmitted to a server from a plurality of mobile video capture devices, wherein the server is configured to generate the composite video using the input video streams, wherein the input video streams are transmitted to the server after the input video streams are recorded or contemporaneously with the recording of the input video streams.

* * * * *